United States Patent
Aliev et al.

(10) Patent No.: US 9,507,535 B2
(45) Date of Patent: Nov. 29, 2016

(54) OFFLOADING RAID UPDATE OPERATIONS TO DISK CONTROLLERS

(71) Applicant: EMC Corporation, Hopkinton, MA (US)

(72) Inventors: Artem Alexandrovich Aliev, St. Petersburg (RU); Peter Vladimirovich Trifonov, St. Petersburg (RU)

(73) Assignee: EMC IP Holding Company LLC, Hopkinton, MA (US)

(*) Notice: Subject to any disclaimer, the term of this patent is extended or adjusted under 35 U.S.C. 154(b) by 270 days.

(21) Appl. No.: 14/236,230

(22) PCT Filed: Mar. 15, 2013

(86) PCT No.: PCT/IB2013/001206
§ 371 (c)(1),
(2) Date: Jan. 30, 2014

(87) PCT Pub. No.: WO2014/140677
PCT Pub. Date: Sep. 18, 2014

(65) Prior Publication Data
US 2014/0351508 A1 Nov. 27, 2014

(51) Int. Cl.
*G06F 3/00* (2006.01)
*G06F 3/06* (2006.01)

(52) U.S. Cl.
CPC .......... *G06F 3/0619* (2013.01); *G06F 3/061* (2013.01); *G06F 3/0659* (2013.01); *G06F 3/0665* (2013.01); *G06F 3/0689* (2013.01)

(58) Field of Classification Search
CPC .. G06F 3/0619; G06F 3/0665; G06F 3/0689; G06F 3/061; G06F 3/0659

USPC ................................................ 710/1
See application file for complete search history.

(56) References Cited

U.S. PATENT DOCUMENTS

| | | | |
|---|---|---|---|
| 6,950,901 B2 | 9/2005 | Chiu et al. | |
| 7,254,754 B2 | 8/2007 | Hetzler et al. | |
| 7,340,576 B1* | 3/2008 | Therene | G06F 12/0804 711/112 |
| 7,752,387 B2 | 7/2010 | Elliott et al. | |
| 2005/0038958 A1* | 2/2005 | Jadon | G06F 3/061 711/114 |
| 2008/0115017 A1* | 5/2008 | Jacobson | G06F 11/1076 714/710 |

FOREIGN PATENT DOCUMENTS

EP 1310875 A2 5/2003

* cited by examiner

*Primary Examiner* — Chun-Kuan Lee
(74) *Attorney, Agent, or Firm* — BainwoodHuang

(57) ABSTRACT

An improved technique involves performing computations for partial stripe updates in a RAID at individual disk controllers rather than at the RAID controller. When a RAID controller receives a request to update old payload data at a block in a particular disk with update data, it sends the update data to the controller of that particular disk. The disk controller reads internally old data from the block, computes the difference between new and old data, replaces the old data on disk with the new data, and returns the difference to the RAID controller. The RAID controller computes difference values of the parity data from the difference values of the payload data received from the disk controllers. It then sends these difference values to the controllers of disks storing parity data. A controller of a disk storing parity data reads internally the corresponding data block, adds to it the difference value, and writes the result back to disk.

13 Claims, 5 Drawing Sheets

OFFLOADING RAID UPDATE OPERATIONS TO DISK CONTROLLERS

BACKGROUND

Redundant arrays of inexpensive disks (RAIDs) provide for reliable storage of payload data by storing additional data in some of the disks of the array. The design of a RAID involves ensuring that, if some number of disks fails, then the data stored in those disks may be recovered from other disks in the array.

Some RAIDs apply codes to segments of payload data to create codewords on the disks of an array. In this manner, in the event of a failure, a RAID controller is able to recover the payload data from those codewords. In some cases, the codes are systematic in that the codewords contain the payload data plus some parity data. The payload data and parity data are stored in payload disks and parity disks, respectively, within the array. The RAID controller is then able to recover data from a maximum number of failed payload disks from the parity disks. The number of payload disks from which data may be recovered depends on the number of parity disks in use.

At some point in time, an application may need to update small blocks of data in a payload disk. In order to accomplish such an update while preserving the integrity of the parity data, a conventional RAID system has the RAID controller update certain parity data along with the payload data. Along these lines, the RAID controller reads current payload data from a block on a payload disk. Before replacing the current payload data with new payload data, however, the RAID controller computes the difference between the current and new payload data and stores that difference in memory. The RAID controller then computes a correction to corresponding parity data from that difference. After computing this correction, the RAID controller locates the corresponding block containing current parity data on a parity disk, reads the current value of the parity data, adds the correction to the current parity data to produce new parity data, and stores the new parity data to that block in the parity disk.

SUMMARY

Unfortunately, there are deficiencies with the above-described conventional RAID system. For example, because a storage system relies exclusively on the RAID controller for the computations in partial stripe updates, the load on the RAID controller can be excessive. Moreover, the disk-to-host links between the RAID controller and the disks in the RAID may saturate because there is too much data being transferred over the links.

In contrast to the conventional RAID system in which the RAID controller handling all operations for partial stripe updates causes reductions in performance, an improved technique involves performing computations for partial stripe updates in a RAID at individual disk controllers rather than at the RAID controller. When a RAID controller receives a request to update old payload data at a block in a particular disk with update data, it sends the update data to the controller of that particular disk. The disk controller reads internally old data from the block, computes the difference between new and old data, replaces the old data on disk with the new data, and returns the difference to the RAID controller. The RAID controller obtains difference values of the parity data from the difference values of the payload data received from the disk controllers. It then sends these difference values to the controllers of disks storing parity data. A controller of a disk storing parity data reads internally the corresponding data block, adds to it the difference value, and writes the result back to disk.

Advantageously, the improved technique frees up the RAID controller for other tasks and eliminates a bottleneck in the performance of the RAID. By distributing computations such as transforming the differences between new data and old data to parity differences among individual disk controllers, the RAID processor only needs to send update values to payload disk controllers and transfer differences to parity disk controllers. This allows for the RAID controller to process other requests such as storing and retrieving data from disks more quickly.

One embodiment of the improved technique is directed to a method updating data stored on a redundant array of disks having an array controller in a storage system, each disk of the redundant array of disks including a disk controller apart from the array controller. The method includes receiving, by the disk controller of a particular disk of the redundant array of disks, a request to update particular data stored in a block on the particular disk, the request including an input value. The method also includes reading the particular data from the block on the particular disk. The method further includes performing, by the disk controller of the particular disk, an update operation on the particular bit data stored in the block on the particular disk, the update operation including a mathematical operation involving the particular bit data and the input value and serving to produce an update result. The method further includes writing, by the disk controller of the particular disk, the update result to the block on the particular disk.

Additionally, some embodiments of the improved technique are directed to a system constructed and arranged to update data stored on a redundant array of disks having an array controller in a storage system. The system includes a data interface, memory, and a controller including controlling circuitry constructed and arranged to carry out the method of updating data stored on a redundant array of disks having an array controller in a storage system.

Furthermore, some embodiments of the improved technique are directed to a computer program product having a non-transitory computer readable storage medium which stores code including a set of instructions which, when executed by a computer, cause the computer to carry out the method of updating data stored on a redundant array of disks having an array controller in a storage system.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves performing some computations for partial stripe updates in a RAID at individual disk controllers rather than at the RAID controller. When a RAID controller receives a request to update old payload data at a block in a particular disk with update data, it sends the update data to the controller of that particular disk. The disk controller reads internally old data from the block, computes the difference between new and old data, replaces the old data on disk with the new data, and returns the difference to the RAID controller. The RAID controller computes difference values of the parity data from the difference values of the payload data received from the disk controllers. It then sends these difference values to the controllers of disks storing parity data. A controller of a disk storing parity data reads internally the corresponding data block, adds to it the difference value, and writes the result back to disk.

Advantageously, the improved technique frees up the RAID controller for other tasks and eliminates a bottleneck in the performance of the RAID. By distributing computations such as transforming the differences between new data and old data to parity differences among individual disk controllers, the RAID processor only needs to send update values to payload disk controllers and transfer differences to parity disk controllers. This allows for the RAID controller to process other requests such as storing and retrieving data from disks more quickly.

Figure 1:
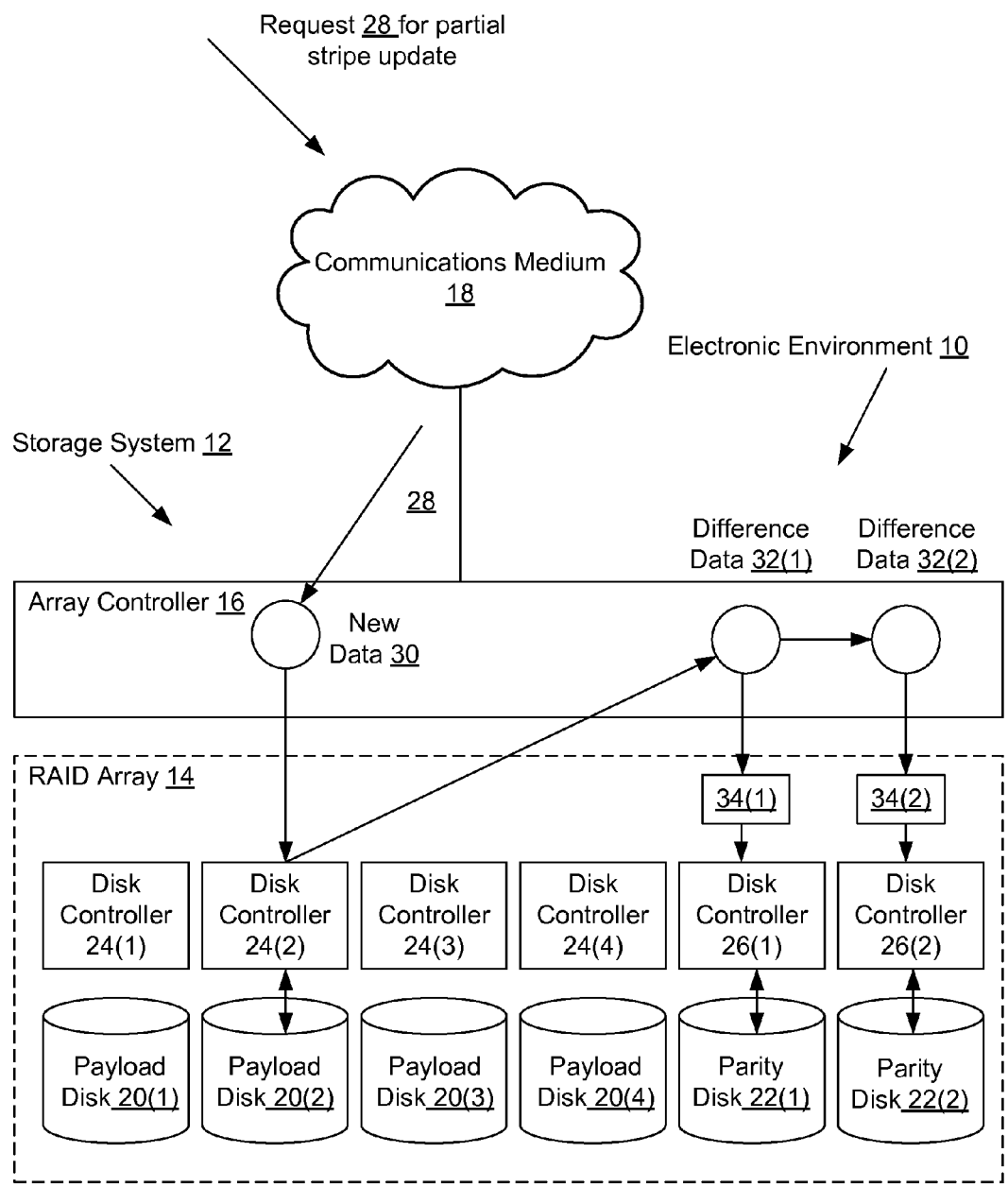
FIG. 1 is a block diagram illustrating an example electronic environment for carrying out the improved technique.

FIG. 1 illustrates an example electronic environment 10 for carrying out the improved technique. Electronic environment 10 includes storage system 12 and communications medium 18.

Communication medium 18 provides network connections between storage system 12 and systems that send requests 28 for partial stripe updates (not pictured) to array controller 16. Communications medium 18 may implement a variety of protocols such as TCP/IP, UDP, ATM, Ethernet, Fibre Channel, SCSI combinations thereof, and the like. Furthermore, communications medium 18 may include various components (e.g., cables, switches/routers, gateways/bridges, NAS/SAN appliances/nodes, interfaces, etc.). Moreover, the communications medium 18 is capable of having a variety of topologies (e.g., queue manager-and-spoke, ring, backbone, multi drop, point to-point, irregular, combinations thereof, and so on).

Storage system 12 is constructed and arranged to store payload data in payload disks 20 and parity data in parity disks 22. Storage system 12 includes RAID array 14 and array controller 16.

RAID array 14 is constructed and arranged to provide storage of data in such a way that data from particular (e.g., payload) disks may be recovered from other (e.g., parity) disks if the particular disks fail. RAID array 14 includes payload disks 20(1), 20(2), 20(3), 20(4) (payload disks 20), parity disks 22(1) and 22(2) (parity disks 22), payload disk controllers 24(1), 24(2), 24(3), and 24(4), and parity disk controllers 26(1) and 26(2).

Array controller 16 is constructed and arranged to receive requests 28 for a partial stripe update. Array controller 16 is also constructed and arranged to send new data 30 to individual payload disk controllers 24. Array controller 16 is also constructed and arranged to accept difference data 32 from individual payload disk controllers 24 and send that difference data to individual parity disk controllers 26.

Payload disk controllers 24 are constructed and arranged to receive new data 30 from array controller 16. Payload disk controllers 24 are also constructed and arranged to swap new data 30 with old data, form a difference 32 between new data 30 and old data, and send that difference 32 to array controller.

Parity disk controllers 26 are constructed and arranged to receive difference data 32 from array controller 16. Parity disk controllers 26 are further constructed and arranged to add the parity difference to parity data on the corresponding parity disk 26 to create updated parity data. In some arrangements, disk controllers may implement the functions of both payload disk controller 24 and parity disk controller 26.

During operation, array controller 16 receives a request 28 over communications medium 18 to update data stored in a block in payload disk 20(2) with new data 30. This request includes a global address of the data block within the array. Array controller 16 then determines the particular payload and parity disks which need to be updated, and addresses of the corresponding data blocks stored on these disks. Array controller 16 then transfers new data 30 to the particular disk controller 24(2) of the disk on which the block should be stored, as well as the block address at which new data 30 should be stored on payload disk 20(2).

Disk controller 24(2), upon receiving new data 30 and the block address, reads the data currently stored in the block at that block address on disk 20(2). Disk controller 24(2) computes the difference 32 between new data 30 and the current data. In some arrangements in which the code used to generate the parity data from the payload data is binary, disk controller 24(2) applies a XOR operation to new data 30 and that current data. Disk controller 24(2) then replaces the current data at that block in disk 20(2) with new data 30. Upon performing this swap, disk controller 24(2) sends difference 32 to array controller 16.

In some arrangements, the operation described above is implemented as a vendor-specific SCSI command. For example, one may defined an extension to current SCSI commands of the form XORSwapData (BlockID, NewData). XORSwapData takes in as arguments a BlockID, which represents the address at which the swap of the data is to take place. In this case, BlockID is unique to disk 20 and array controller 16 obtains this value from the global address of the data block within disk array. Array controller 16 then sends the XORSwapData command to disk controller 24(2), which is configured to execute this command and perform the data swap and difference computation as described above.

Upon receiving differences 32, array controller 16 performs mathematical transformations 34 on differences 32; these transformations 34 depend on a particular type of erasure correcting code being used, to obtain the parity data difference. Array controller 16 then determines which blocks on parity disks 22 must be updated once the payload data to which the parity data corresponds has also been updated. For example, array controller 16 looks up the BlockID of payload data and the BlockID of corresponding parity data using the global address of the block of payload data. In the case illustrated in FIG. 1, both parity disks 22(1) and 22(2) contain such corresponding parity data.

Array controller 16, in this case, sends parity data difference (i.e., transformed payload data difference 32) to both parity disk controllers 26(1) and 26(2). Specifically, when the coding scheme used to encode payload data is a linear block code with generator matrix $G=(I|A)$, where I is the identity matrix and A is the parity matrix (i.e. it is systematic), then a codeword c is determined from a corresponding payload vector x by computing c=xG. New payload data 30, represented here as x', produces difference 32, represented as δ=x'−x. The difference to be applied to parity disks 22 is then computed by array controller as Δ=δA.

Parity disk controllers 26, upon receiving difference Δ together with the block address in parity disks 22 reads the current value of the parity data there. Parity disk controllers 26 then add difference Δ to the current value to produce a new parity value. Parity disk controllers then write the new parity values to their respective parity disks 22.

In some arrangements, the coding scheme involves a binary alphabet as described above. In that case, parity disk controllers 36 computes the new parity data by applying an XOR to the old parity data read from the blocks and the difference Δ.

In some arrangements, the operation described above is also implemented as a vendor-specific SCSI command. For example, one may defined an extension to current SCSI commands of the form XORData (BlockID, DiffData). XORData takes in as arguments a BlockID, which represents the address at which the data is to be updated. In this case, BlockID is unique to disk 22. Array controller 16 then sends the XORData command to disk controller 24(2), which is configured to execute this command and perform the computation of the parity difference and the addition of that difference to the old data as described above.

Figure 2:
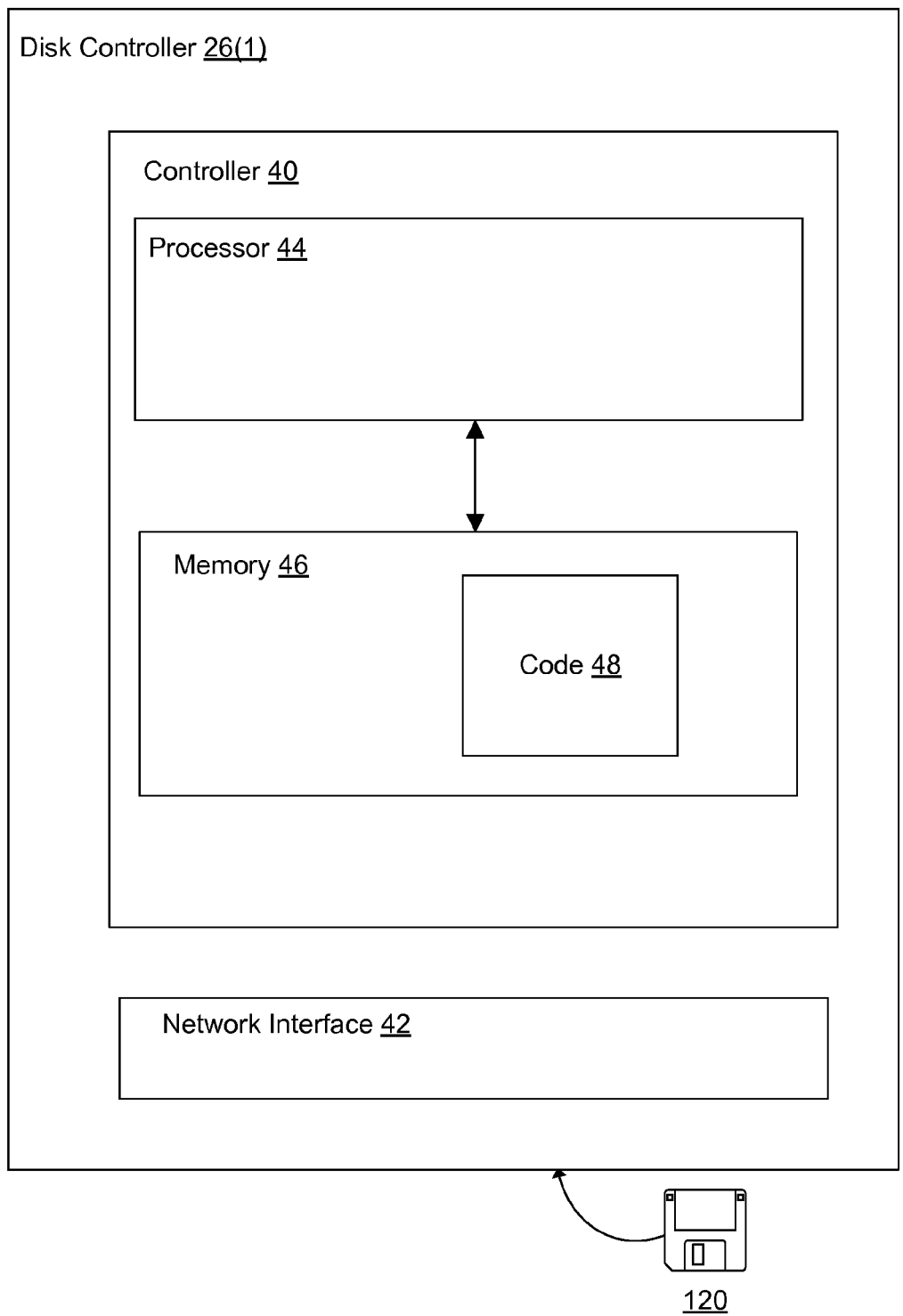
FIG. 2 is a block diagram illustrating an example disk controller within the electronic environment shown in FIG. 1.

FIG. 2 illustrates details of an example disk controller 26(1). Disk controller 26(1) includes controller 40, which in turn includes processor 44 and memory 46, and data interface 42, such as SATA, SAS, Fiber Channel, etc.

Memory 46 is configured to store code 48 that contains instructions configured to cause processor 44 to carry out the improved technique. For example, for disk controller 26(1), code 48 contains instructions for the SCSI command extension XORSwapData. On the other hand, if parity disk controller 26(1) were being described here, then code 48 would contain instructions for XORData as described above. Memory 46 generally takes the form of, e.g., random access memory, flash memory or a non-volatile memory.

Processor 44 takes the form of, but is not limited to, ARM, Intel or AMD-based MPUs, and can include a single or multi-cores each running single or multiple threads. In some arrangements, processor 44 is one of several processors working together. Processor 44 is configured to carry out the improved technique by executing code 48.

Figure 3:
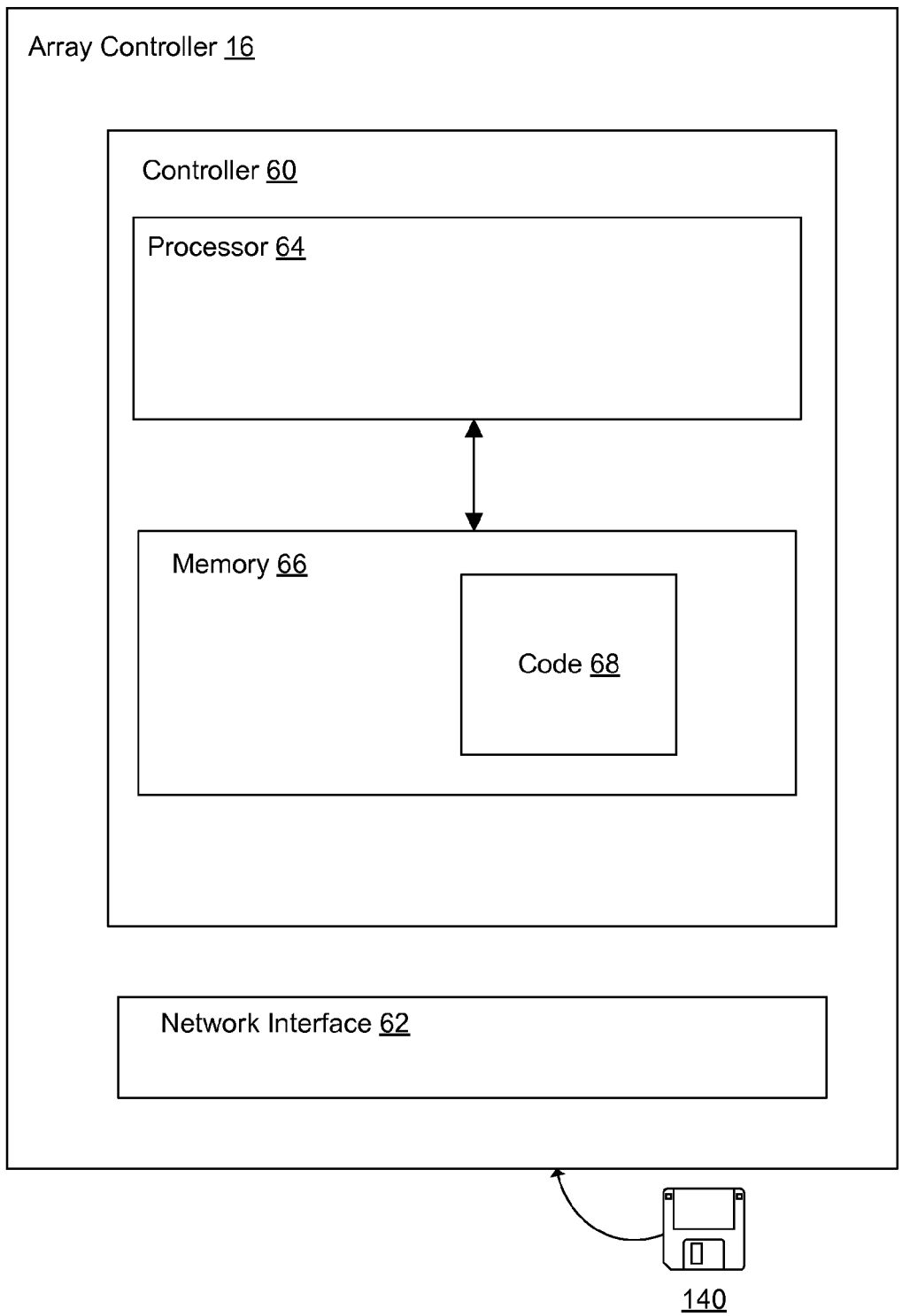
FIG. 3 is a block diagram illustrating an example array controller within the electronic environment shown in FIG. 1.

FIG. 3 illustrates details of an example array controller 16. Array controller 16 includes controller 60, which in turn includes processor 64 and memory 66, and data interface 62.

Data interface 62 takes the form of a SAS, SATA, Fiber Channel, Infiniband, or Ethernet adapter; in some arrangements, network interface 62 takes other forms including a wireless receiver and a token ring card.

Memory 66 is configured to store code 68 that contains instructions configured to cause processor 64 to carry out the improved technique. Memory 66 generally takes the form of, e.g., random access memory, flash memory or a non-volatile memory.

Processor 64 takes the form of, but is not limited to, Intel or AMD-based MPUs, and can include a single or multi-cores each running single or multiple threads. In some arrangements, processor 64 is one of several processors working together. Processor 64 is configured to carry out the improved technique by executing code 68.

Figure 4:
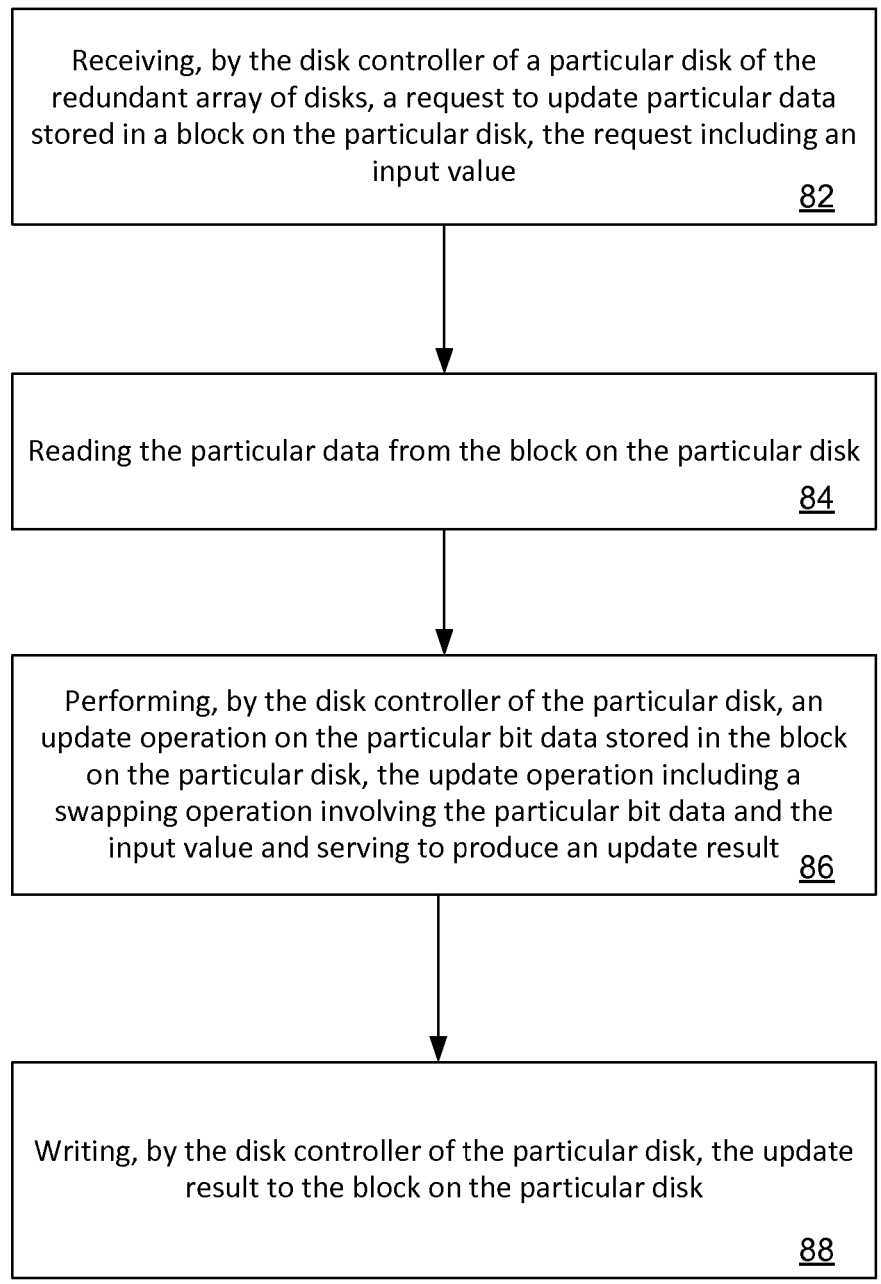
FIG. 4 is a flow chart illustrating an example method of carrying out the improved technique within the electronic environment shown in FIG. 1.

FIG. 4 illustrates an example method 80 of updating data stored on a redundant array of disks having an array controller in a storage system, each disk of the redundant array of disks including a disk controller apart from the array controller, including steps 82, 84, 86, and 88. In step 82, a request to update particular data stored in a block on the particular disk is received by the disk controller of a particular disk of the redundant array of disks, the request including an input value. In step 84, the particular data is read from the block on the particular disk. In step 86, an update operation is performed on the particular bit data stored in the block on the particular disk, the update operation including a swapping operation involving the particular bit data and the input value and serving to produce an update result. In step 88, the update result is written to the block on the particular disk.

Figure 5:
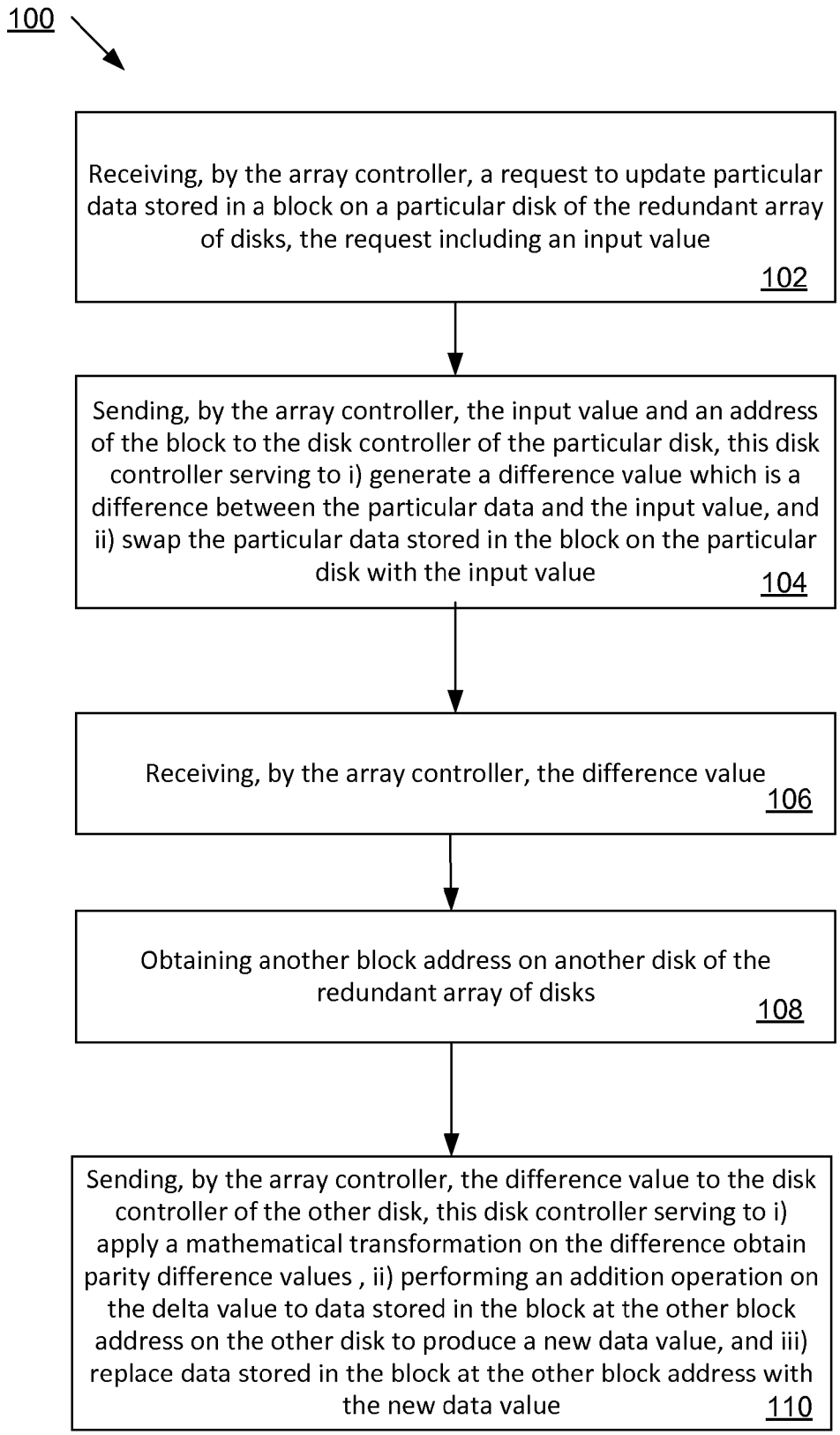
FIG. 5 is another flow chart illustrating an example method of carrying out the improved technique within the electronic environment shown in FIG. 1.

FIG. 5 illustrates another example method 100 of updating data stored on a redundant array of disks having an array controller in a storage system, each disk of the redundant array of disks including a disk controller apart from the array controller, including steps 102, 104, 106, 108, and 110. In step 102, a request to update some data block identified by a global array address is received by the array controller, the request including an input value. The array controller identifies the payload and parity disks, as well as addresses of blocks on them, which need to be updated in order to keep the array in a consistent state. In step 104, the input value and an address of the block is sent by the array controller to the disk controller of the particular disk, this disk controller serving to i) generate a difference value which is a difference between the particular old data and the input value, and send it to array controller, and ii) swap the particular old data stored in the block on the particular disk with the input value. In step 106, the difference value is received by the array controller. Having received these difference values from payload disks being updated, a mathematical operation is applied to them to obtain parity difference values. In step 110, the parity difference value is sent by the array controller to the disk controllers parity disks identified earlier. The parity disk controller serving to i) read old parity data stored in a given block, ii) add the parity difference value to old parity data block, and iii) replace data stored in the block at the other block address with the new data value.

While various embodiments of the invention have been particularly shown and described, it will be understood by those skilled in the art that various changes in form and details may be made therein without departing from the spirit and scope of the invention as defined by the appended claims.

For example, it should be understood that the improved technique applies to any type of linear block code, whether maximum distance separable (MDS) or not. Furthermore, different areas of the same disk within an array may be alternatively used to store payload or parity data above. Nevertheless, the improved technique may still be applied.

Furthermore, it should be understood that some embodiments are directed to disk controller 24, which is constructed and arranged to update data stored on a redundant array of disks having an array controller in a storage system, each disk of the redundant array of disks including a disk controller apart from the array controller. Some embodiments are directed to a process of updating data stored on a redundant array of disks having an array controller in a storage system, each disk of the redundant array of disks including a disk controller apart from the array controller. Also, some embodiments are directed to a computer program product which enables computer logic to update data stored on a redundant array of disks having an array controller in a storage system, each disk of the redundant array of disks including a disk controller apart from the array controller.

It should also be understood that some embodiments are directed to array controller 16, which is constructed and arranged to update data stored on a redundant array of disks having an array controller in a storage system, each disk of the redundant array of disks including a disk controller apart from the array controller. Embodiments are directed to a process of updating data stored on a redundant array of disks having an array controller in a storage system, each disk of the redundant array of disks including a disk controller apart from the array controller.

In some arrangements, disk controller 24 is implemented by a set of processors or other types of control/processing circuitry running software. In such arrangements, the software instructions can be delivered, within disk controller 24, either in the form of a computer program product 120 (see FIG. 2) or simply instructions on disk or in pre-loaded in memory 46 of disk controller 24, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

In other arrangements, array controller 16 is implemented by a set of processors or other types of control/processing circuitry running software. In such arrangements, the software instructions can be delivered, within array controller 16, either in the form of a computer program product 140 (see FIG. 3) or simply instructions on disk or in pre-loaded in memory 66 of array controller 16, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. In a storage system including a redundant array of disks having an array controller, each disk of the redundant array of disks including a disk controller apart from the array controller, a method of updating data stored on the redundant array of disks, the method comprising:
   receiving, by the disk controller of a particular disk of the redundant array of disks, a request to update particular data stored in a block on the particular disk, the request including an input value;
   reading, by the disk controller of the particular disk, the particular data from the block on the particular disk;
   performing, by the disk controller of the particular disk, an update operation on the particular data stored in the block on the particular disk, the update operation including a swapping operation involving the particular data and the input value and serving to produce an update result; and
   writing, by the disk controller of the particular disk, the update result to the block on the particular disk;
   wherein the input value includes a replacement value;
   wherein performing the update operation on the particular data stored in the block on the particular disk includes:
      generating a difference value which is a difference between the particular data and the replacement value, the difference value serving as the update result, and
      sending the difference value to the array controller.

2. A method as in claim 1,
   wherein the particular data, and the replacement value are payload data including an array of binary values;
   wherein generating the difference value includes:
      performing an XOR operation on the particular data and the replacement value.

3. In a storage system including a redundant array of disks having an array controller, each disk of the redundant array of disks including a disk controller apart from the array controller, a method of updating data stored on the redundant array of disks, the method comprising:
   receiving, by the disk controller of a particular disk of the redundant array of disks, a request from the array controller to update particular parity data stored in a block on the particular disk, the request including a difference value, the array controller having obtained the difference value in response to a communication from a disk controller of a different disk that stores a portion of payload data associated with the particular parity data;
   reading, by the disk controller of the particular disk, the particular parity data from the block on the particular disk;
   performing, by the disk controller of the particular disk, an update operation on the particular parity data stored in the block on the particular disk, the update operation including a swapping operation involving the particular parity data and the difference value and serving to produce an update result, wherein performing the update operation on the data stored in the block on the particular disk includes:
      performing an addition operation on the difference value to the particular parity data stored in the block on the particular disk to produce, as the update result, a new parity data value, and
      replacing the data stored in the block on the particular disk with the new parity data value.

4. A method as in claim 3,
   wherein the particular parity data is a codeword produced from the payload data by a generator matrix;
   wherein performing the addition operation includes:
      receiving from the array controller a product of a vector of difference values and a column of the generator matrix.

5. In a storage system including a redundant array of disks having an array controller, each disk of the redundant array of disks including a disk controller apart from the array controller, a method of updating data, the method comprising:
   receiving, by the array controller, a request to update particular payload data stored in a block on a particular disk of the redundant array of disks, the request including an input value;
   sending, by the array controller, the input value and an address of the block to the disk controller of the particular disk, this disk controller serving to i) generate a difference value which is a difference between the particular payload data and the input value, and ii) swap the particular payload data stored in the block on the particular disk with the input value;
   receiving, by the array controller, the difference value from the disk storing payload data;
   computing, by the array controller, a parity difference value based on the received difference value;
   obtaining another block address on another disk of the redundant array of disks; and sending, by the array controller, the parity difference value to the disk controller of the other disk, this disk controller serving to i) read old parity data stored at the other block address, ii) add the parity difference value to the old parity data to yield a new parity value, and iii) replace the old parity data stored at the other block address with the new parity value.

6. A method as in claim 5,
wherein a generator matrix represents a systematic coding of payload data, the generator matrix containing an identity matrix and a parity matrix;
wherein computing the parity difference values includes:
applying elements of the parity matrix to the parity difference values, and
excluding elements of the identity matrix from the parity difference values.

7. A storage system constructed and arranged to update data stored on the redundant array of disks, the storage system comprising:
a redundant array of disks having an array controller, each disk of the redundant array of disks including a disk controller apart from the array controller, each disk controller including:
a data interface;
memory; and
a controller including controlling circuitry, the controlling circuitry being constructed and arranged to:
receive, by the disk controller of a particular disk of the redundant array of disks, a request to update particular data stored in a block on the particular disk, the request including an input value, the input value including a replacement value;
read the particular data from the block on the particular disk;
perform, by the disk controller of the particular disk, an update operation on the particular data stored in the block on the particular disk, the update operation serving to produce an update result, wherein performing the update operation includes:
generating a difference value which is a difference between the particular data and the replacement value, the difference value serving as the update result, and
sending the difference value to the array controller via the data interface; and
write, by the disk controller of the particular disk, the update result to the block on the particular disk.

8. A storage system as in claim 7,
wherein the particular data, and the replacement value are payload data including an array of binary values;
wherein generating the difference value includes:
performing an XOR operation on the particular data and the replacement value.

9. A storage system as in claim 7, wherein the disk controller is configured to execute SCSI commands.

10. A storage system as in claim 7, wherein the controlling circuitry is further constructed and arranged to:
receive a parity update request from the array controller to update particular parity data stored in a block on the particular disk, the request including a difference value, the array controller having obtained the difference value in response to a communication from a disk controller of a different disk that stores a portion of payload data associated with the particular parity data;
read the particular parity data from the block on the particular disk;
perform a parity update operation on the particular parity data stored in the block on the particular disk, the parity update operation including a swapping operation involving the particular parity data and the difference value and serving to produce a parity update result,
wherein performing the parity update operation on the data stored in the block on the particular disk includes:
performing an addition operation on the difference value to the particular parity data stored in the block on the particular disk to produce, as the parity update result, a new parity data value, and
replacing the parity data stored in the block on the particular disk with the new parity data value.

11. A storage system as in claim 10,
wherein the particular parity data is a codeword produced from payload data by a generator matrix;
wherein performing the addition operation includes:
receiving from the array controller a product of a vector of difference values and a column of the generator matrix.

12. A computer program product having a non-transitory, computer-readable storage medium which stores code for updating data stored on a redundant array of disks in a storage system, the redundant array of disks having an array controller, each disk of the redundant array of disks including a disk controller apart from the array controller, the code including instructions which, when executed by the disk controller, causes the disk controller to:
receive, by the disk controller of a particular disk of the redundant array of disks, a request to update particular data stored in a block on the particular disk, the request including an input value;
read the particular data from the block on the particular disk;
perform, by the disk controller of the particular disk, an update operation on the particular data stored in the block on the particular disk, the update operation including a swapping operation involving the particular data and the input value and serving to produce an update result; and
write, by the disk controller of the particular disk, the update result to the block on the particular disk;
wherein the input value includes a replacement value;
wherein performing the update operation on the particular data stored in the block on the particular disk includes:
generating a difference value which is a difference between the particular data and the replacement value, the difference value serving as the update result, and
sending the difference value to the array controller.

13. A computer program product as in claim 12,
wherein the particular data, and the replacement value are payload data including an array of binary values;
wherein generating the difference value includes:
performing an XOR operation on the particular data and the replacement value.

* * * * *